United States Patent [19]

Tanaka et al.

[11] Patent Number: 4,994,847

[45] Date of Patent: Feb. 19, 1991

[54] APPARATUS FOR SORTING AND TRANSPORTING SHEETS

[75] Inventors: Yoshihisa Tanaka, Higashiosaka; Yukio Hashimoto, Kadoma; Tadashi Fujioka, Toyonaka; Yoshiki Yoshioka, Tsuzuki, all of Japan

[73] Assignee: Mita Industrial Co., Ltd., Japan

[21] Appl. No.: 420,314

[22] Filed: Oct. 12, 1989

[30] Foreign Application Priority Data

Oct. 12, 1988 [JP] Japan .............................. 63-257899

[51] Int. Cl.[5] .............................................. G03B 27/32

[52] U.S. Cl. ........................................ 355/26; 355/23; 271/184

[58] Field of Search ....................... 355/23, 24, 25, 26, 355/75; 271/184, 185, 186

[56] References Cited

U.S. PATENT DOCUMENTS 4,099,150 7/1978 Connin ................................ 355/23

4,512,651 4/1985 Dunleavy, Jr. ....................... 355/23

4,774,545 9/1988 Tsuji et al. ........................... 355/23

*Primary Examiner*—L. T. Hix

*Assistant Examiner*—Khanh Dang

*Attorney, Agent, or Firm*—Beveridge, DeGrandi & Weilacher

[57] ABSTRACT

An apparatus for sorting and transferring sheets comprises storing means for storing a stack of sheets, first transferring means for transferring a sheet located at an end of the stack of the sheets from the storing means in a first direction, and second transferring means for transferring the next sheet located at the end of the stack of the sheets from the storing means in a second direction. The first and second directions are different from each other. The apparatus for sorting and transferring the sheets is applied; for example, to an automatic original transferring apparatus and a temporary storing tray of a copying machine.

18 Claims, 12 Drawing Sheets

APPARATUS FOR SORTING AND TRANSPORTING SHEETS

BACKGROUND OF THE INVENTION

The present invention relates to an apparatus for sorting and transporting sheets, an apparatus for automatically transporting original sheets and an automatic paper feeding apparatus. More specifically, the present invention relates to those apparatuses for storing a stack of sheets.

Japanese Patent Laying-Open No. 17359/1981, Japanese Patent Laying-Open No. 74263/1981 and Japanese Patent Laying-Open No. 159859/1985 are examples which disclose copy machines as conventional apparatuses which require the sorting of a group of stacked sheets.

The copying machines have a storing part for storing a stack of original sheets. The original sheet at the bottom of the group of the original sheets is transported by rollers and positioned at the exposure point of the copying machine. After exposure, the original sheet is transported by rollers and stacked on a stack of the original sheets. In this way, the original sheets are circulated from the storing part through the exposure point.

The copy machines produce a two-sided copy corresponding to two one-sided original sheets as in the following: First, all the even-numbered pages of the original, for example, are copied. The copy sheets are turned and fed again to copy the odd-numbered pages on the other side. Accordingly, these kinds of copying machines circulate all the original sheets when either the even-numbered pages or the odd-numbered pages are copied. Therefore, all the original sheets must be circulated twice to make each two-sided copy. That is, in the conventional copying machine, the odd-numbered pages of the original sheets are only transported, without copy processing, when the even-numbered pages are copied, and the even-numbered pages are only transported, without processing, when the odd-numbered pages are copied. This means the transportation of the original sheets is inefficient and the process speed is thus limited.

A copying machine disclosed in Japanese Patent Laying-Open No. 21073/1980 comprises an automatic original transporting apparatus having two original transport lanes. In this case, when an even-numbered page/sheet of the original is transported through a lane and copied, an odd-numbered page/sheet of the original is being transported through the other lane while the even-numbered page/sheet of the original is being exposed.

This copying machine, however, has only one exit in the storing part to the original transport lanes, so that only after a sheet of the original is completely transported out of the storing part can the next sheet of original begin to be transported. Further, according to the above constitution, the sheet of the original to be copied must be detained while the next sheet of the original is being transported. Therefore, the conventional copying machine can not transport the sheets of he original at high speed.

SUMMARY OF THE INVENTION

It is an object of the present invention to provide an apparatus for storing and transporting sheets which has high degree of freedom in terms of sheet transportation directions, by which the time of sheet transportation is made shorter and various kinds of sheets can be easily transported.

It is another object of the present invention to provide an automatic original transporting apparatus in an image forming apparatus which transports original sheets in a short period of time, whereby the period of the image forming can be shortened.

(1) An apparatus for sorting and transporting sheets according to the present invention comprises: storing means for storing a group of stacked sheets; first transferring means for transferring a sheet located at one end of the group of stacked sheets from the storing part in a first direction; and second transferring means for transferring a sheet located at the end of the group of stacked sheets from the storing part in a second direction. The first and the second directions are different from each other.

In the apparatus according to the present invention, the first transporting means transports a sheet located at one end of the group of stacked sheets from the storing means in a first direction. The second transporting means transports a sheet located at the end of the group of stacked sheets from the transporting means in a second direction which is different form the first direction. As a result, the sheets are transported in the different directions, so that the degree of freedom in terms of sheet transportation directions is increased, shortening sheet transportation time and allowing easy transport of various kinds of sheets.

When the apparatus is used as an automatic original transporting apparatus in an image forming apparatus, for example, each of two sheets of original can be transported in different directions. As a result, the efficiency of transportation of originals is increased, reducing the transportation time, and thereby reducing the image forming time. Moreover, when the apparatus is used as an automatic material sheet feeding apparatus of an image forming apparatus, a sheet of the material paper is transported in one direction and another sheet of the material paper is transported in another direction. Accordingly, the degree of freedom in terms of feeding originals to be processed is increased additionally, thereby reducing the image forming time. Further, OHP sheets and their mounts stacked thereover can be sorted as one group of sheets. Accordingly, various kinds of sheets can be easily transported.

(2) An automatic original transporting apparatus in an image forming apparatus according to the present invention comprises storing means, first transferring means, second transferring means and returning means.

The storing part is for storing a stack of originals. The first transferring means is for transferring a sheet of the original located at one end of the stack of the originals from the storing part in a first direction and positioning the sheet of the original at the exposure point of the image forming apparatus. The second transferring means is for transferring out of the storing part a sheet of the original located at the end of the stack of the originals in a second direction different from the first direction. The returning means is for returning the pair of the sheets of the original transported out by the first and second transferring means in order to stack them on the other end of the stack of the originals.

In the automatic original transporting apparatus in the image forming apparatus according to the present invention, the first transferring means transports a sheet of the original located at an end of the stack of the originals stored in the storing part from the storing part in a first direction and positions the sheet at the exposure point of the image forming apparatus. The second transferring means transports a sheet of the original located at the end of the stack of the originals from the storing part in a second direction different from the first direction. Then, the returning means returns the pair of the sheets of the original transported by the first and the second means to stack them on the other end of the stack of the originals. Therefore, since two sheets of the original are transported in the different directions at almost the same time, the original transporting time is reduced and, as a result, the image forming time is reduced.

The above operation will be described more specifically in case of making a two-sided copy from one-sided originals as follows: When the first sheet of the original located at one end of the stack of the originals stored in the storing part is an even-numbered page of the original, for example, the first transferring means transports the even-numbered page of the original from the storing part in a first direction and positions the sheet at the exposure point of the image forming apparatus. The second transferring means transports the next, odd-numbered page of the original, located at the end of the stack of the originals from the storing part in a second direction different from the first direction. Then, the returning means returns the pair of the sheets of the original transferred by the first and the second means to stack them on the other end of the stack of the originals. Therefore, the odd-numbered page of the original can be transferred at almost the same time the even-numbered page of the original to be exposed is transferred, so that time is not spent only transporting sheets of the original, without a copying process. Time for transporting the originals is thus reduced. As a result, the time required for image forming is reduced.

(3) An automatic original transporting apparatus and an automatic sheet feeding apparatus in an image forming apparatus according to the present invention comprise storing means, transferring means, first feeding means and second feeding means.

The storing means is for storing a stack of copied sheets. The transferring means is for transporting a copied sheet located at an end of the stack of copied sheets from the storing part in a first direction. The first feeding means is for transferring a copied sheet located at the end of the stack of the sheets for the storing part in a second direction different form the first direction, and positioning the sheet at the image copying point of the image forming apparatus. The second feeding means is for transferring in the second direction the copied sheet which was transferred by the transferring means, through its original position in the storing means, after the first feeding means transfers the other copied sheet, and positioning the sheet at the image copying point of the image forming apparatus.

For example, in the automatic sheet feeding apparatus of the image forming apparatus according to the present invention, the transferring means transports a copied sheet located at an end of the stack of the sheets stored in the storing means from the storing means in a first direction. Then, the first feeding means transfers the next copied sheet located at the end of the stack of the sheets from the storing part in a second direction and positions the sheet at the image copying point of the image forming apparatus. After the first feeding means transfers the other copied sheet, the second feeding means transfers the copied sheet which was transferred by the transferring means, through its original position in the storing part in the second direction, and positions the sheet at the image copying point of the image forming apparatus. Therefore, before the copied sheet located at the end of the stack in the initial condition is transferred to the image copying point, the next copied sheet is transferred to the image copying point. As a result, the transporting order of the copied sheets can be changed to suit the feeding of the original. Accordingly, wasteful transportation of originals which is required in the conventional apparatus becomes unnecessary, reducing the original processing time, so that the image forming time is reduced.

The above operation will be described more specifically in the case of obtaining a two-sided copy form one-sided originals as follows: First, all sheets of the original are fed in an ordinary order to copy the respective images onto the copy sheets, and the copied sheets are then turned and stored in the storing means of the automatic feeding apparatus. Assuming that the first copied sheet located at an end of the stack of the sheets stored in the storing part is an even-numbered page, the transferring means transfers that copied sheet in a first direction. Then, the first feeding means transfers the next copied sheets, copied with the image of an odd-numbered page of the original, from the storing part in a second direction and places the sheet at the image copying position in the image forming apparatus. The copied sheet is copied with the same image of the even-numbered page as that of the copied sheet transferred by the transferring means.

Next, the second feeding means transfers the copied sheet transferred by the transferring means, through its original position in the storing part in the second direction, and places the sheet at the image copying position in the image forming apparatus. The copied sheet is copied with the same image of the odd-numbered page as that of the copied sheet transferred by the first feeding means.

Repeating the above operation, two two-sided copies can be obtained by circulating the original twice, without any loss in the operation. Therefore, the operation does not require the time for only transferring the sheets of the original without a copying process, so that the processing time of the original is reduced and, as a result, the image forming time is reduced.

These and other objects and advantages of the present invention will be more fully apparent from the following detailed description.

DESCRIPTION OF THE PREFERRED EMBODIMENT

Embodiment I

Figure 1:
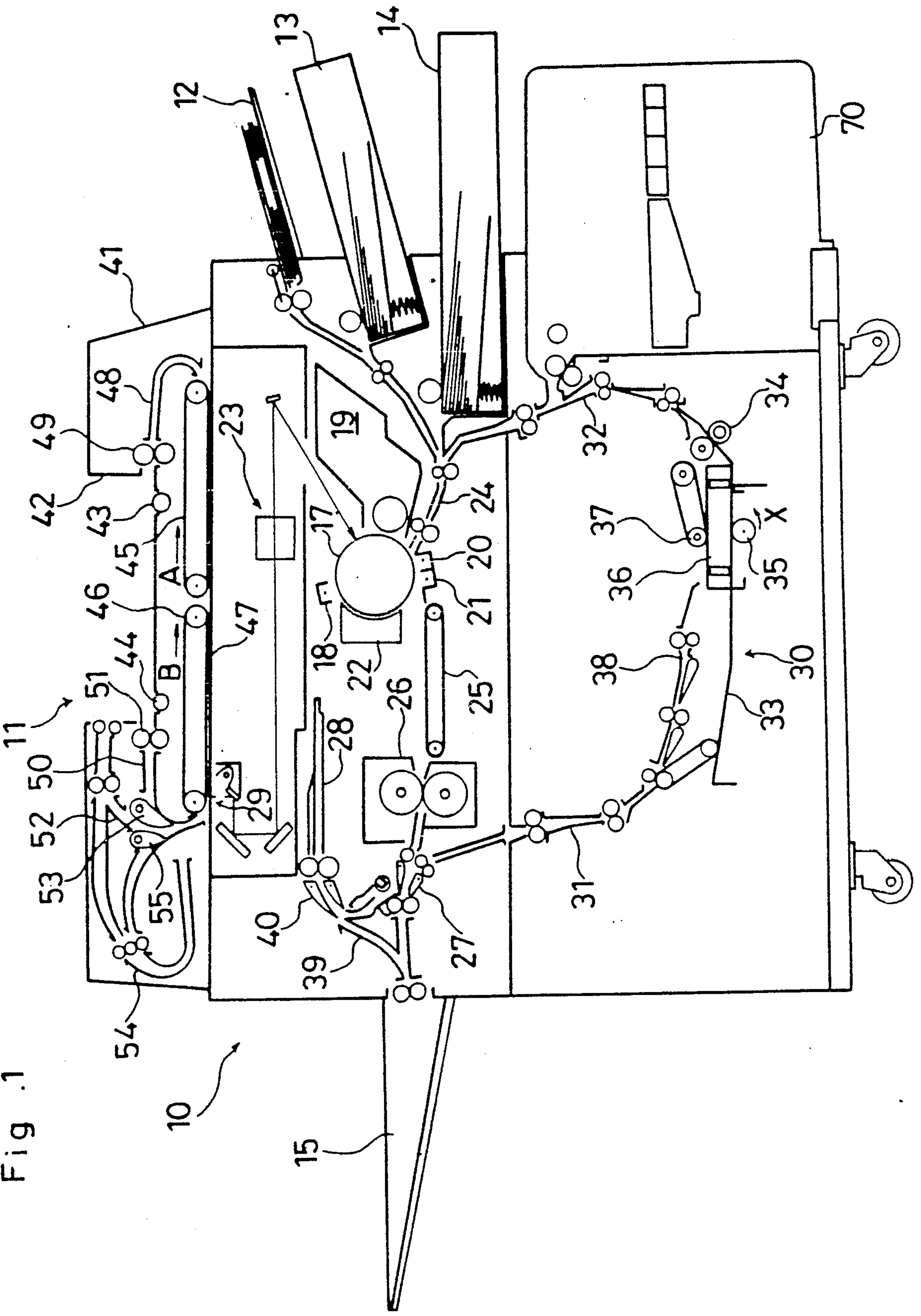
FIG. 1 is a schematic sectional view showing a copying machine of an embodiment according to the present invention.

Referring to FIG. 1, which shows an embodiment according to the present invention, a copying machine 10 has an automatic original transferring apparatus 11 at the top portion. In the right side portion of the copying machine 10 in FIG. 1, a bypass plate 12, paper cassette cases 13 and 14, and a large size paper cassette case 70 are disposed vertically. Disposed in the left side portion of the copying machine 10 is a catch tray 15.

In about center of the copying machine 10, a photosensitive drum 17 is disposed. The photosensitive drum 17 is surrounded by a corona-generating device 18, a development system 19, a transfer station 20, a detach station 21, and a cleaning system 22, in that order. In a space located in the upper portion of the copying machine 10, an exposure device 23 of the optical system is disposed. Paper transferring lanes 24 are provided between the bypass plate 12, etc. and the transfer station 20. A paper transferring system 25 and a fuser assembly 26 are disposed in that order, lower than the transfer system 20, in terms of paper flow. A branching 27 is placed between the fuser assembly 26 and the catch tray 15. Disposed above the branching 27 is a turning device 28. The branching 27 can be switched between a first position, shown in FIG. 1, for connecting the fuser assembly 26 and a paper transferring lane 31 (described later) to the catch tray 15, and a second position, for connecting those to the turning device 28. The turning device 28 has a bypass lane 39 connected to the catch tray 15 for transferring sheets to the catch tray 15, and a branching 40 for guiding a sheet stored in the device 28 to either the branching 27 or the bypass lane 39.

In the lower space of the copying machine 10, a temporary storing tray 30 is disposed, from which the lowermost sheet is forwarded for feeding. Between the left end of the temporary storing tray 30 and the branching 27, a paper transferring lane 31 is disposed. Another paper transferring lane 32 connects the right end of the temporary storing tray 30 to a middle portion of the paper transferring lane 24. The top end, or the lower end in terms of paper flow, of the paper transferring lane 32 is connected to the paper transferring lane 24 so that the paper lane functions smoothly for feeding the paper to the transfer station 20.

The temporary storing tray 30 comprises a paper base 33 extending horizontally, feeding rollers 34 placed at the right end of the paper storage base 33, and a forwarding roller 35 in the right middle portion of the paper storage base 33. A pair of side plates 36 is provided near the forwarding roller 35 to regulate deviation of papers in the widthwise direction (which is the direction perpendicular to the sheet containing the drawing). A presser roller 37 is above the forwarding roller 35 and presses downwards on the paper stored on the paper storage base 33. An end of the paper transferring lane 31 near the temporary storing tray 30 has a paper transferring lane 38 which can change the position from which sheets fall on the paper base 33 corresponding to the paper size.

The automatic original transferring apparatus 11 has storing part 42 in the middle of a housing 41, in which a stack of original is stored. The right end portion and the left end portion of the base of the storing part 42 have forwarding rollers 43 and 44. The forwarding rollers 43, 44 are positioned partially above the base surface of the storing part 42 to touch the lower surface of the stack of the original stored in the storing part 42.

Below the storing part 42, a pair of transferring belts 45, 46 are disposed. The transferring belt 45 extends between a pair of rollers which have a space therebetween in the lateral direction and is circulated by the rollers in the direction of the arrow A. The transferring belt 46 extends between a pair of rollers which has a space therebetween in the lateral direction and is circulated by the rollers in the direction of the arrow B, and the reverse direction. The bottom surfaces of the transferring belts 45 and 46 are faced to a transparent contact glass 47 which is fixed to the top end of the body of the copying machine 10. The exposure point 29 of the exposure device 23 moves from side to side in FIG. 1 when it scans a stopped sheet of the original, but it is fixed at the point against the left roller of the transferring belt 46 as shown in FIG. 1 when it scans a moving sheet of the original.

In the right end portion of the housing 41, a primary sheet feeding lane 48 is provided which turns like a "J" to connect the bottom of the storing part 42 to the bottom part of the transferring belt 45. An end portion of the primary sheet feeding lane 48 near the storing part 42 has feeding rollers 49 which consist of a pair of rollers adjacent to the forwarding roller 43. In the left end portion of the housing 41, a secondary sheet feeding lane 50 is provided which turns like a "J" to connect the bottom portion of the storing part 42 to the bottom portion of the transferring belt 46. An end portion of the secondary sheet feeding lane 50 near the storing part 42 has feeding rollers 51 which consists of a pair of rollers adjacent to the forwarding roller 44. Above the secondary sheet feeding lane 50, a discharging lane 52 is disposed which has an outlet in the upper portion of the storing part 42. The upper end portion of the discharging lane 52 in terms of sheet flow is connected to a middle portion of the secondary sheet feeding lane 50, and a switching guide 53 is located at the connecting point. A reversing lane 54 is provided on the left of the discharging lane 52. The upper end of the reversing lane 54 in terms of sheet flow is connected to the connecting point of the secondary sheet feeding lane 50 and the discharging lane 52, and a switching guide 55 is provided at the connecting point. The lower end of the reversing lane 54 in terms of sheet flow is connected to the middle portion of the discharging lane 52 to discharge a sheet of the original in the reversing lane 54 to the outlet of the discharging lane 52.

The copying machine 10 has a control unit (not shown) comprising a microcomputer and is controlled by that as described below.

The operation of the above embodiment will be described with reference to flow charts shown in FIGS. 2 to 4. For example, there are four sheets of original in the storing part 42, the upper surfaces of which are front surfaces as shown in FIG. 5A. FIG. 5 is a schematic view showing the original in the storing part 42 and copied paper in the temporary storing tray 30 and the catch tray 15. In this figure, the surface having a triangle has an image, and a number in the triangle indicates the page number.

Figure 2:
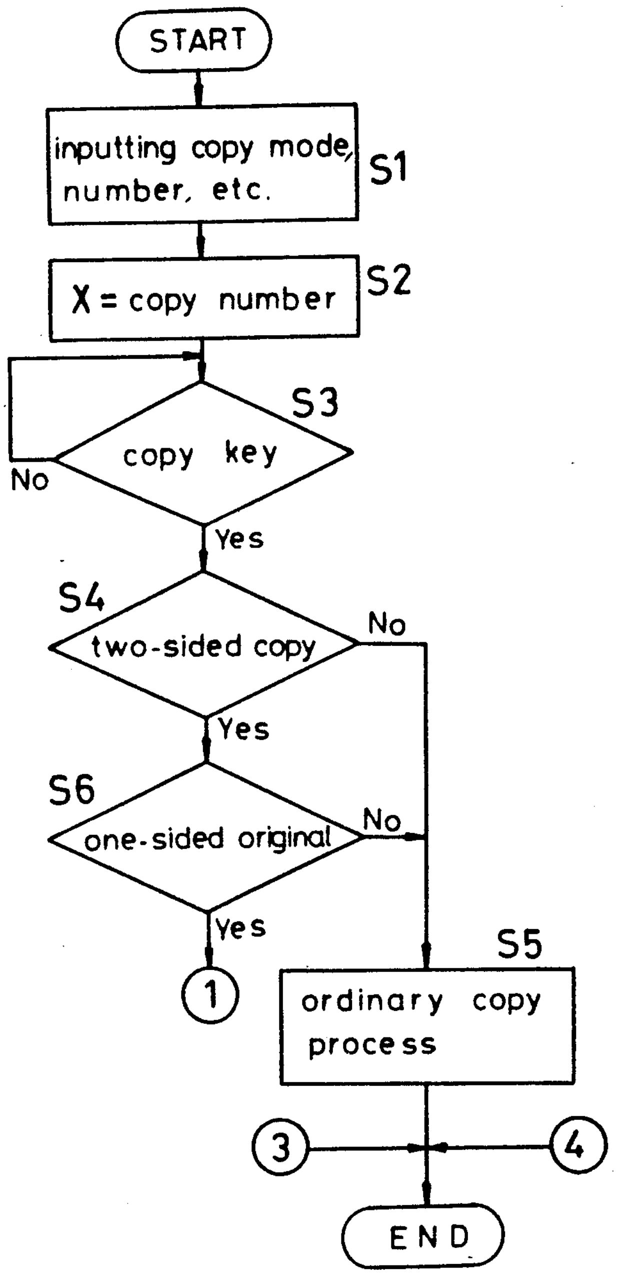
FIGS. 2, 3 and 4 are control flow charts of the embodiment shown in FIG. 1.
Figure 3:
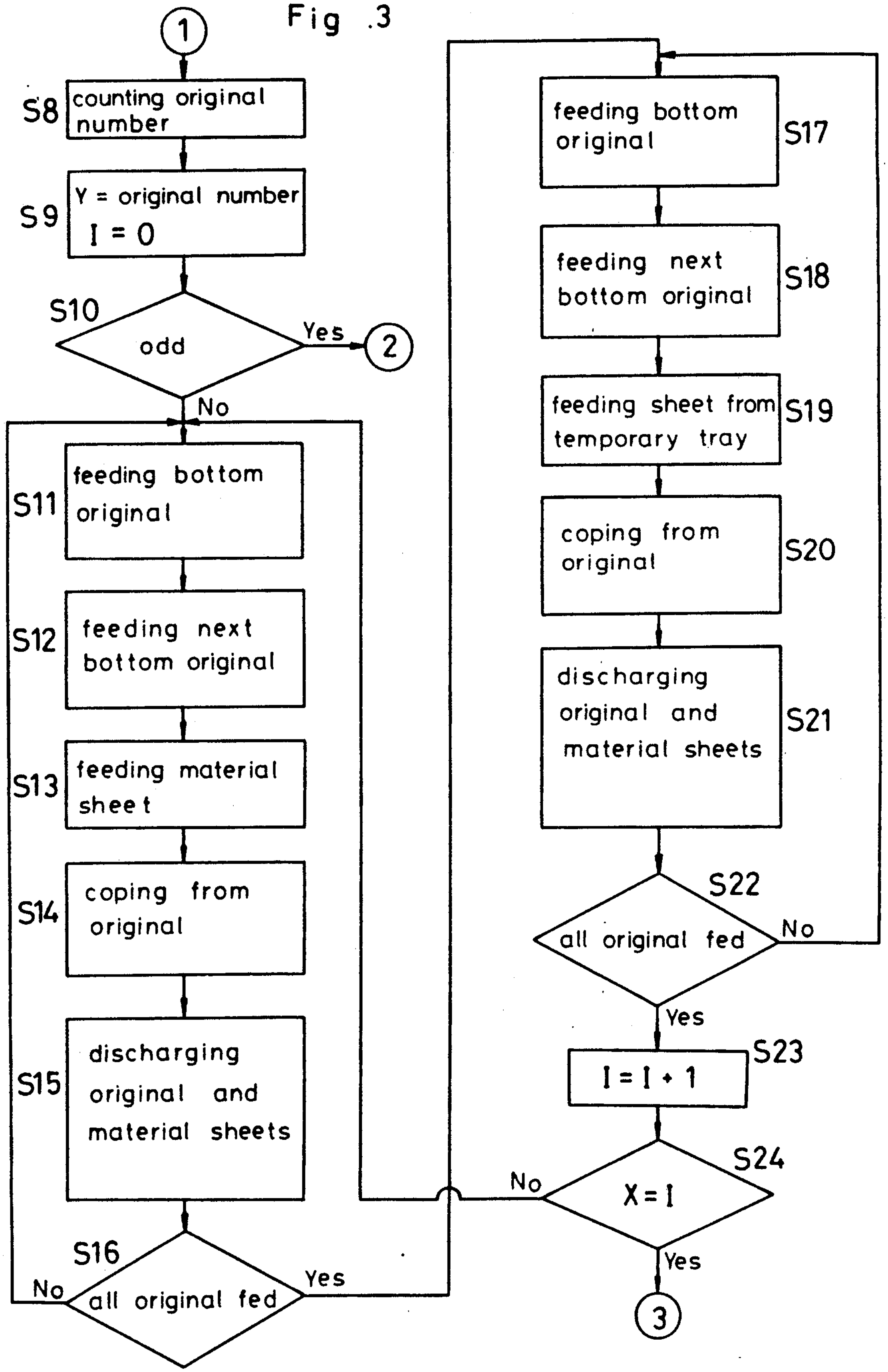

Referring to FIG. 2, after the program starts, an initial setting, including setting an initial sheet size and an initial copy number, is inputted through a control panel (not shown) at step S1. At step S2, the copy number inputted at the step S1 is stored as X. At step S3, the program waits for the copy key to be pushed, which means starting a copy operation. After pushing the copy key, the program goes to the next step, S4.

At step S4, it is judged whether the two-sided copy mode was designated at step S1. When the two-sided copy was not designated, step S5 proceeds and the program finishes after an ordinary copy process is carried out. If the two-sided copy mode was designated at step S4, step S6 proceeds, at which it is judged whether the original is one-sided or two-sided, depending upon a designation at step S1. When the original is two-sided, step S5 proceeds, and the program finishes after an ordinary copy process is carried out. When the original is one-sided at step S6, step S8 in FIG. 3 proceeds.

At step S8, the pages of the original are counted. First, the switching guides 53, 55 are positioned as shown in FIG. 1. Each sheet of the original stacked in the storing part 42 is circulated from the bottom of the stack through the primary sheet feeding lane 48, the transferring belt 45, the transferring belt 46, and the discharging lane 52. While circulating the original, a count system (not shown) counts the pages of the original. The counted number of pages of the original is stored as "Y" and 0 is set "I", which means an actual copy number at step S9. At step S10, it is judged whether the number of the original pages is odd or even. Since the number of the original pages is even in this case, step S11 proceeds.

At step S11, the forwarding rollers 43 and feeding rollers 49 feed the sheet of page 4 of the original at the bottom of the storing part 42 to the primary sheet feeding lane 48. For this feeding, the transferring belt 45 circulates in the direction A. Then, the switching guide 53 is shifted to open the secondary sheet feeding lane 50, and the forwarding roller 44 and the feeding rollers 51 feed the sheet of page 3 of the original in the storing part 42 to the secondary sheet feeding lane 50. For this feeding the transferring belt 46 circulates in the direction B. This process step S12 is carried out subsequently after the sheet of the original moves to the primary sheet feeding lane 48 and the end of the sheet of the original leaves at the forwarding roller 44 at step S11. As a result, the feeding of a sheet through the primary sheet feeding lane 48 and the feeding of a sheet through the secondary sheet feeding lane 50 are carried out almost the same time. That is, according to the embodiment, a sheet of an odd page of the original is transferred while a sheet of an even page of the original to be exposed is transferred. After the sheet of page 4 of the original is set below the transferring belt 45 and the sheet of page 3 of the original is set below the transferring belt 46, the transferring belt 46 subsequently circulates in the direction B. By the circulation, the sheets of pages 3 and 4 of the original are transferred to the discharging lane 52. During this process, the exposure point 29 of the exposure device 23 is fixed at the position shown in FIG. 1, so that the sheet of page 4 of the original is scanned due to its movement, and a material sheet is transferred from either the bypass plate 12, the paper cassette case 13, 14 or 70 to the transfer station 20 at step S13. The image of page 4 of the original is transferred to the material sheet at step S14. Further, the sheet copied is transferred to the fuser assembly 26 for fusing. At step S15, the sheets of pages 3 and 4 of the original are discharged subsequently through discharging lane 52 to the storing part 42. Meanwhile, the branching 27 is set for the turning device 28, and then the copied sheet corresponding to page 4 of the original is turned in the turning device 28 and placed on the paper base of the temporary storing tray 30 through the paper transferring lane 31.

At step S16, it is judged whether the sheets of the original have been transferred. Since the sheets of pages 1 and 2 of the original have not been fed in this case, the program goes back to step S11 again. Then, using the sheets of pages 1 and 2 of the original, steps S11 to S15 are carried out again.

Figure 5A:
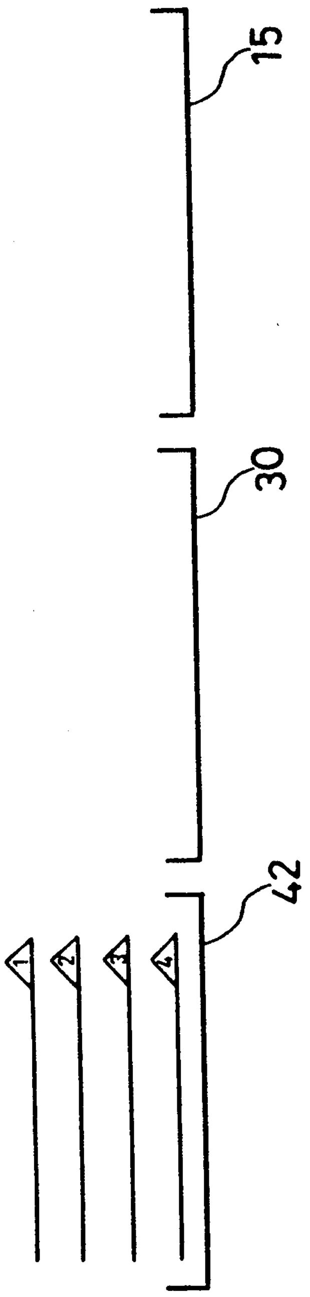
FIGS. 5A, 5B and 5C are schematic views showing a condition of original and material paper in the embodiment of FIG. 1.
Figure 5B:
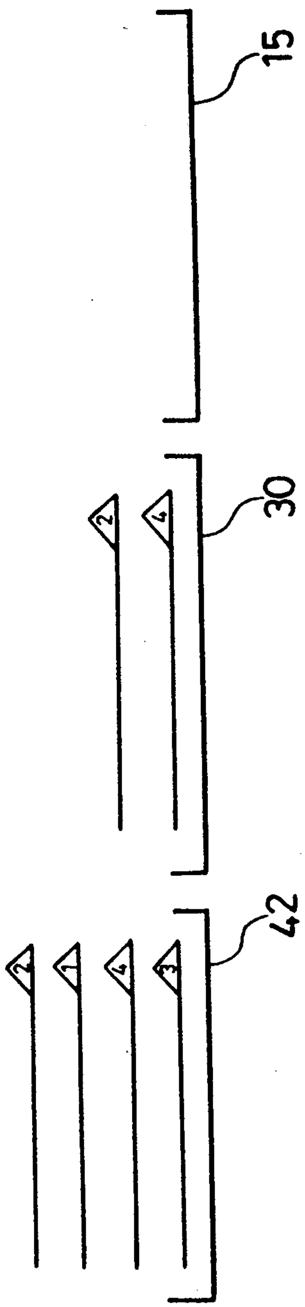

After that, step S17 proceeds since it is judged that all the pages of the original has been fed at step S16. The momentary condition of the original and the copied sheets stored in the storing part 42, the temporary storing tray 30, and the catch tray 15, respectively, is shown in FIG. 5B.

The sheet of page 3 of the original at the bottom of the storing part 42 is transferred through the main sheet feeding lane 48 at step S17. Then, the switching guide 53 is rotated to open the secondary sheet feeding lane 50 and the sheet of page 4 pages in the storing part 42 is transferred through the secondary sheet feeding part 50. In this case, the process of step S18 starts subsequently after the sheet of the original moves to the primary sheet feeding lane 48 or the end of the sheet leaves the forwarding roller 44. Therefore, feeding a sheet through the primary sheet feeding lane 48 and feeding a sheet through the secondary sheet feeding lane 50 are carried out at almost the same time. That is, the sheet of an even-numbered page of the original is transferred while the sheet of an odd-numbered page of the original to be exposed is transferred. Just after the sheet of page 3 of the original is set below the transferring belt 45 and the sheet of page 4 of the original is set below the transferring belt 46, the transferring belt 46 circulates in the direction B. By this circulation, the sheets of pages 3 and 4 of the original are transferred subsequently to the discharging lane 52. During the process, the moving sheet of page 3 of the original is being scanned at the exposure position 29 in FIG. 1, since the exposure position 29 of the exposure device 23 is fixed at the point shown in FIG. 1.

At step S19, the sheet of the material paper copied with the image corresponding to page 4 of the original in the sheets stored in the temporary storing tray 30 is transferred to the transfer system 20 in synchronization with the timing of the exposure of the sheet of page 3 of the original. Then, the image of page 3 of the original is transferred to the sheet of the material paper at step S20. The copied sheet is transferred to the fuser assembly 26 to be fused. Then, the sheets of pages 3 and 4 of the original are discharged subsequently to the storing part 42 through the discharging lane 52 at step S21. Meanwhile, the branching 27 is set for the catch tray 15 and the copied sheet having the images of pages 3 and 4 of the original is discharged on the catch tray 15.

At step S22, it is judged whether all the sheets of the original have been fed. Since the sheets of page 1 and 2 of the original have not been fed in this case, the program goes back to step S17. Then, using the sheets of page 1 and 2 of the original, steps S17 to S21 proceed again.

Figure 5C:
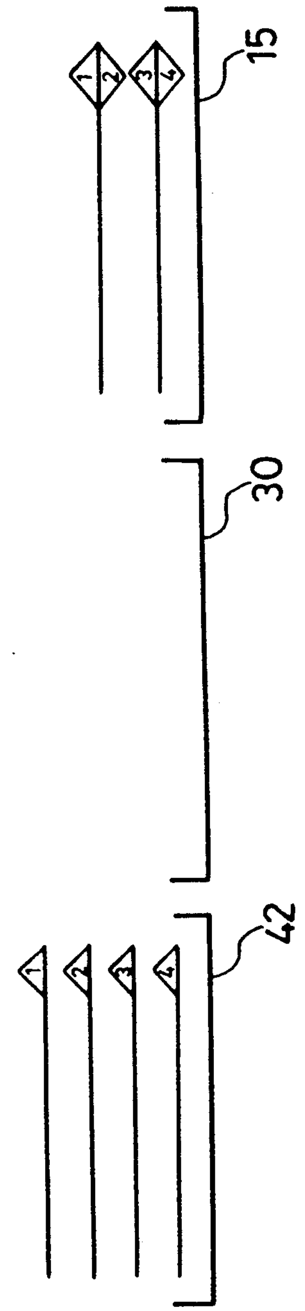

After that, when it is detected that all the sheets of the original have been fed at step S22, step S23 proceeds. FIG. 5C shows the condition at the moment of the original and copied sheets stored in the storing part 42, the temporary storing tray 30 and the catch tray 15, respectively. As shown in FIG. 5C, the order of the originals stacked in the storing part 42 is the same as that before transferring, and the copied sheets copied on both sides are stacked in the catch tray 15 in the correct order.

Since the two-sided copying corresponding to all the originals has been carried out at this moment, "1" is added to "I" at step S23. Then, it is judged whether "X" is equal to "I" at step S24. If these are equal, the program finishes, because the predetermined number of copies was obtained. Meanwhile, if "X" is not equal to "I" at step S24, the processes from step S11 to step S22 are carried out until "X" equals "I" at step S24.

In the above, four sheets of the original were used so as to understand the operation easily. Other numbers of sheets of original, however, can be used if the number is even.

Figure 4:
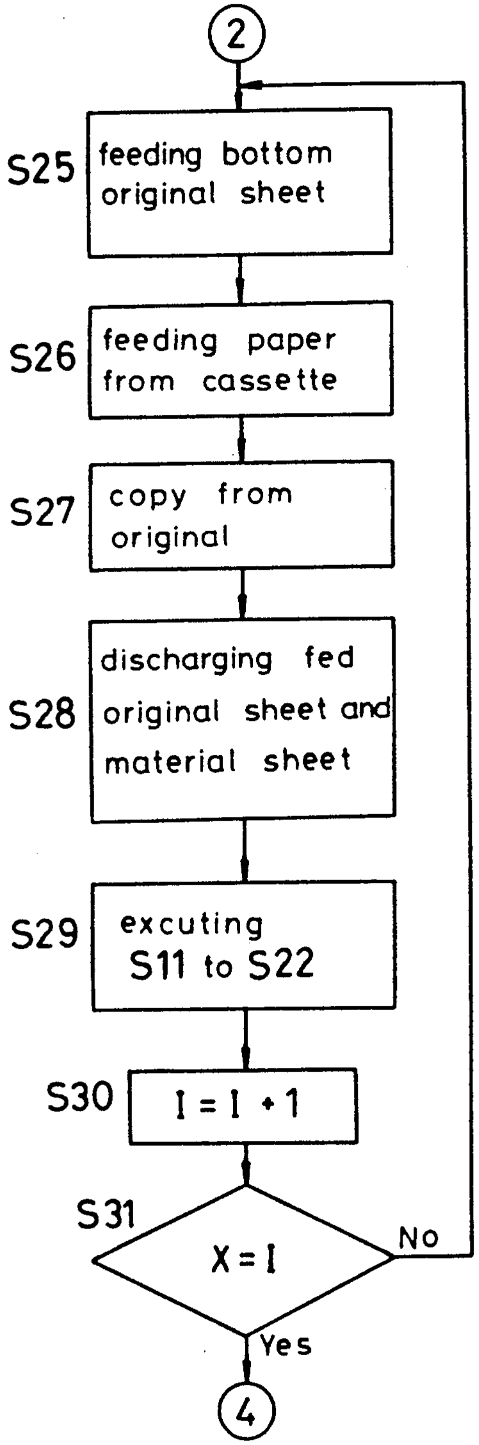

When the number of the original pages counted at step S8 is odd, the program moves from step S10 to step S25 in FIG. 4. At step S25, a sheet of an odd-numbered page of the original at the bottom of the paper transferring lane 24 is transferred through the sheet feeding lane 48. Then the sheet of the original is transferred through the transferring belts 45 and 46 and scanned at the fixed position shown in FIG. 1, since the exposure point 29 of the exposure device 23 is fixed at the point shown in FIG. 1.

A sheet of the material paper is transferred from either the bypass plate 12, or the paper cassette cases 13, 14 or 70, to the transfer station 20 in synchronization with the scanning of the original at step S26. Then, at step S27, the image corresponding to the sheet of the odd-numbered page of the original is transferred to the sheet of the material paper, and the sheet of the material paper is transferred to the fuser assembly 26 to be fused. Further, at step S28, the sheet of the odd-numbered page of the original is discharged through the discharging lane 52 to the storing part 42. Meanwhile, the branching 27 is set for the catch tray 15, and the sheet copied with the image of the odd-numbered page of the original is discharged to the catch tray 15.

After the operation involving the sheet of the odd-numbered page of the original positioned at the bottom of the storing part 42, the number of the rest of the originals becomes even. Therefore, at step S29, two-sided copies can be obtained by processing the remaining even number of sheets of the original through the execution of steps S11 to S22. After the execution, the sheets of the original in the storing part 42 are stored in the same order as the order before processing, and the sheets of the two-sided copy are stacked in the catch tray 15 in the correct order.

Since all of the two-sided copies corresponding to all the pages of the original have been finished at that moment, "1" is added to "I" at step S30. Then, at step S31, it is judged whether "X" is equal to "I". If these are equal, the program is finished because the predetermined number of copies has been obtained. If "X" does not equal "I" at step S31, steps S25 to S29 are executed until "X" equals "I" at step S31.

Figure 6:
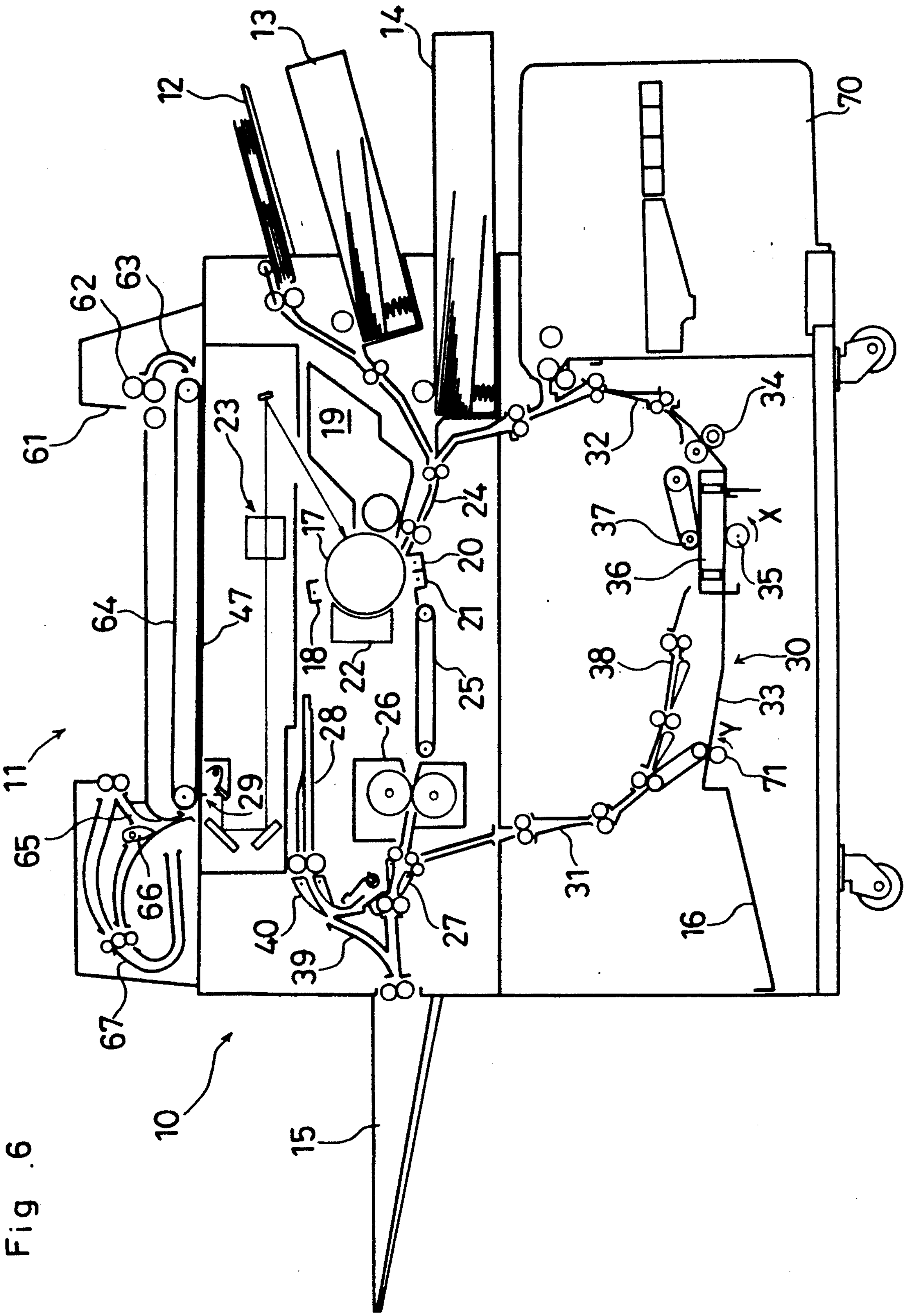
FIG. 6 is a schematic sectional view showing a copying machine of another embodiment according to the present invention.

According to the embodiment, since the next sheet of the original can be transferred while a sheet of the original to be exposed is transferred, the time used only for transferring the sheet of the original without a copying process is not required, so that the processing time of the originals is thus shortened. By this means, the image processing time is also shortened. Embodiment II FIG. 6 shows the second embodiment according to the present invention. In FIG. 6, the same members as those of the copying machine 10 shown in FIG. 1 have the same reference numbers.

The embodiment of FIG. 6 has an automatic original transporting apparatus 11 which is a conventional one of the bottom-paper advancing type. The automatic original transporting apparatus 11 comprises a storing part 61, feeding rollers 62 located at the outlet of the storing part 61, a sheet feeding lane 63 receiving a sheet from the feeding rollers 62, a transferring belt 64 opposed to the contact glass 47 and receiving a sheet from the sheet feeding lane 63, and a discharging lane 65 receiving a sheet from the end of the transferring belt 64 near the exposure position 29. The outlet of the discharging lane 65 is disposed at the upper portion of the storing part 61. A reversing lane 67 is connected through a switching guide 66 to the discharging lane 65.

In FIG. 6, the temporary tray 30 has a retracting roller 71 located at the left end portion of the base 33. A paper discharging tray 16 is provided on the left of the paper storage base 33 and is connected to it.

Now, the operation of the embodiment will be described referring to the flow chart shown in FIGS. 7 to 11. It is assumed that there are four sheets of the original stored in the storing part 61 as shown in FIG. 12A. FIG. 12 schematically shows a condition of the sheets of the original and the material paper in the storing part 61, the temporary storing tray 30, and the catch tray 15. Also in this figure, the surface of the sheet having a triangle has a copied image, and the number in each of the triangles indicates the page number.

Figure 7:
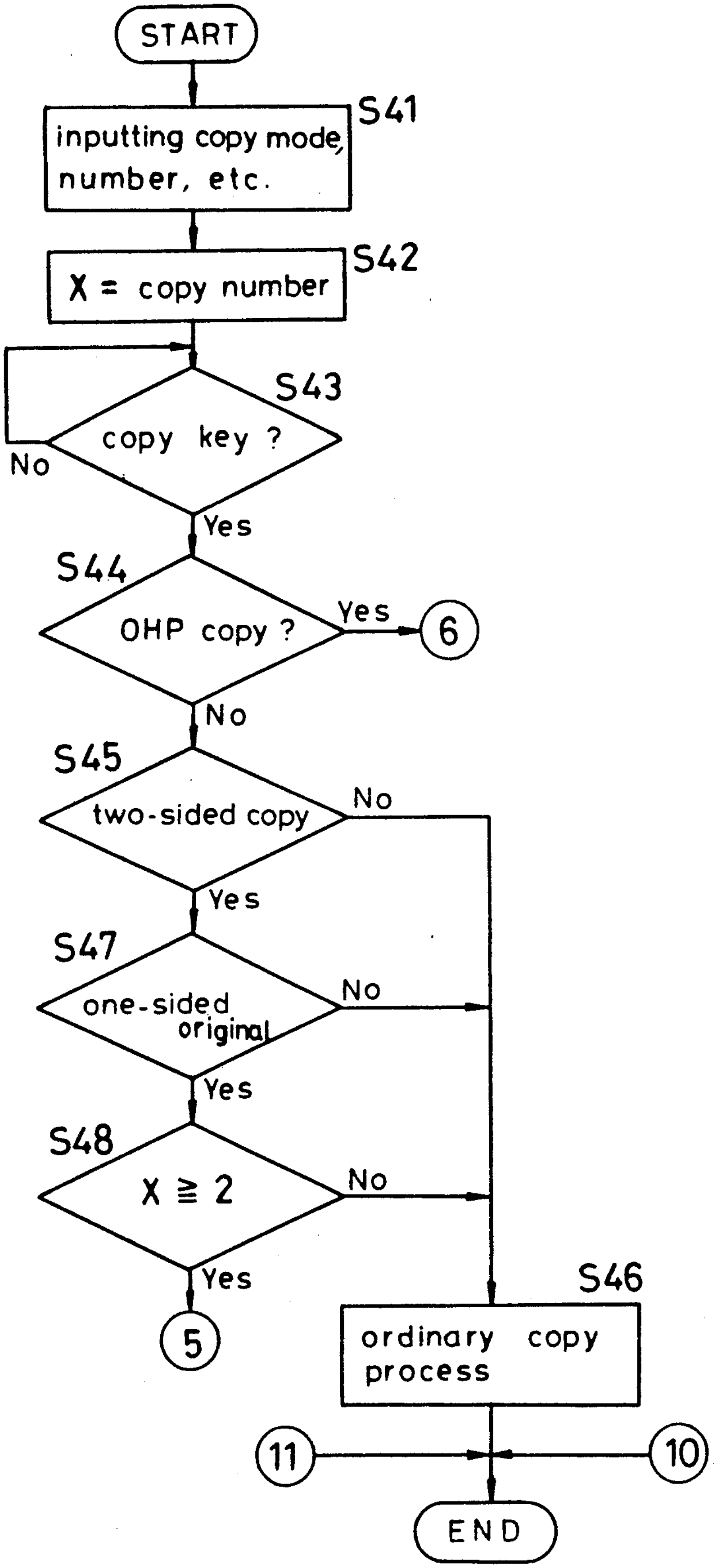
FIGS. 7 to 11 are control flow charts of the embodiment shown in FIG. 6.
Figure 8:
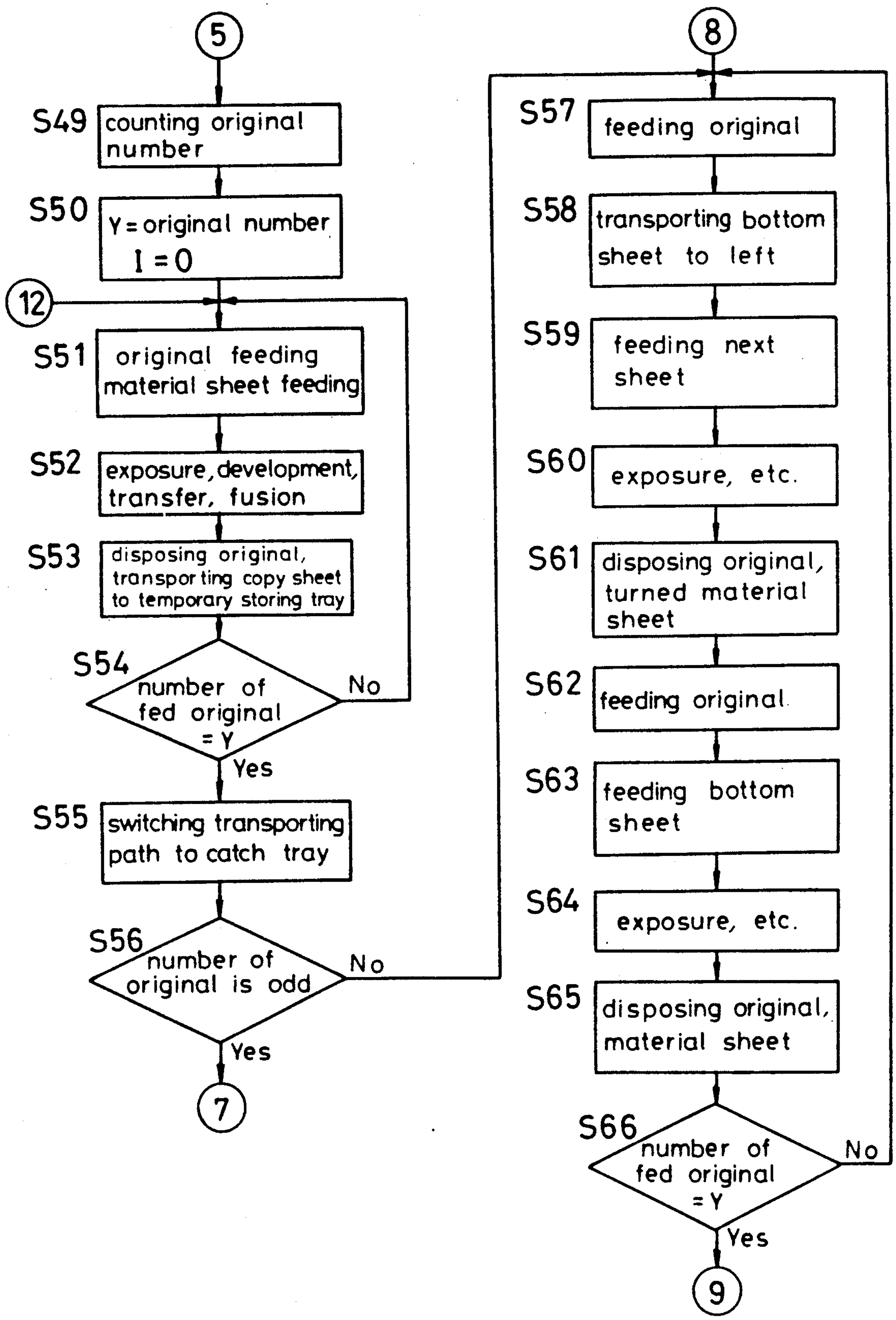
Figure 9:
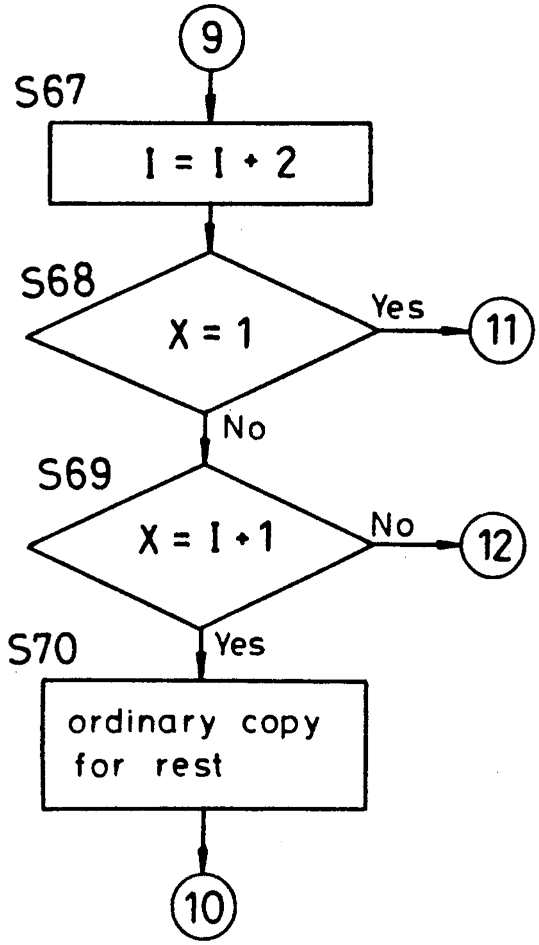

Referring to FIG. 7, after the program starts, the initial conditions, such as the kind of paper and the number of copies, are set by inputting the information through a control panel (not shown) at step S41. The number of copies inputted at step S41 is stored as "X" at step S42. The program waits for the pressing of the copy key, which means the start of a copy operation at step S43. After the copy key is pressed, step S44 proceeds.

At step S44, it is judged whether the copy mode for OHP sheets is designated. When the ordinary copy mode is designated, step S45 is executed. At step S45, it is judged whether the two-sided copy mode was designated at step S1. If the two-sided copy mode was not designated, step S46 is executed to perform an ordinary copy process, and the program is finished. If the two-sided copy mode was designated at step S45, step S47 is executed and it is judged whether the original is either a one-sided original or a two-sided original at step S47, depending upon the designation at step S1. When the original is two-sided, step S46 is executed to perform an ordinary copy process and then the program ends. When a one-sided original is detected at step S47, step S48 is executed to judge whether the number of copies is more than one. If the number of copies is 1, step S46 is executed to perform an ordinary copy process and then the program ends. If the number of copies is more than 1 at step S48, step S49 in FIG. 8 proceeds.

At step S49, the number of the original sheets is counted. In this process, the switching guide 66 is set as shown in FIG. 6, and the stack of the originals in the storing part 61 is circulated one by one from the bottom through the feeding rollers 62, the sheet feeding lane 63, the transferring belt 64 and the discharging lane 65. During the circulation, a counting device (not shown) counts the number of the original sheets. Then, the counted number of the original sheets is stored as "Y" and 0 is set to "I" which determines the number of copies actually carried out at step S50.

At step S51, page 4 of the original sheets, located at the bottom of the storing part 61, is transferred by the feeding rollers 62 and the transferring belt 64. Since the exposure point 29 of the exposure device 23 is fixed at the point shown in FIG. 6, the sheet of page 4 is exposed at the shown point during the movement of the sheet. Meanwhile, a sheet of the material paper is transported from either the bypass plate 12, or the paper cassette case 13, 14 or 70, to the transfer station 20. Then, at step S52, the image corresponding to page 4 of the original is transferred to the material paper, and the paper is transported to the fuse assembly 26 to fuse the image. At step S53, the sheet of page 4 of the original is discharged through the discharging lane 65 to the storing part 61. Meanwhile, the branching 27 is switched for the turning device 28, and the sheet copied with the image of page 4 of the original is turned in the turning device 28. After that, the sheet is placed on the paper storage base 33 of the temporary storing tray 30 through the paper transferring lane 31.

It is judged whether the number of transported sheets of the original becomes "Y" at step S54. If the number does not become "Y", the processes from step S51 to step S53 are carried out again since all the sheets of the original have not been circulated. When all the sheets of the original have been circulated, the number of the sheets of the original transported becomes "Y" at step S54, so that step S55 is executed. At step S55, the branching 27 is switched to the catch tray 15. Then, it is judged whether the number of the sheets of the original "Y" is odd or even at step S56. In this case, the number of the originals is even, so that step S57 proceeds. The momentary condition of the original and the material paper as stored in the storing part 61, the temporary storing tray 30 and the catch tray 15, respectively, is shown in FIG. 12B.

At step S57, the sheet of page 4 of the original at the bottom of the storing part 61 is transported from the primary sheet feeding lane 48. Meanwhile, just after starting the paper feeding operation at step S57, step S58 and step S59 proceed approximately in parallel. At step S58, the forwarding roller 35 rotates in the direction of the arrow X, and the sheet of the material paper copied with an image of page 4 of the original positioned at the bottom of the stack on the temporary storing tray 30 moves to the left. Further, the retracting roller 71 rotates in the direction of the arrow Y, so that the sheet of the material paper moves to the left. Accordingly, the next sheet of the material paper copied with the image of page 3 of the original comes into contact with the forwarding roller 35. Next, at step S59, the forwarding roller 35 rotates in the reverse direction to the arrow X, and the feeding rollers 34 start rotating, so that the sheet of the material paper copied with the image of page 3 of the original is fed to the transfer station 20. Subsequently, at step S60, the transfer station 20 transfers the image of page 4 of the original to the fed sheet of the material paper and the fuser assembly 26 fuses it. At step S61, the sheet of page 4 of the original is discharged through the discharging lane 65 to the storing part 61. The branching 27 is switched to the turning device 28. The sheet of the material paper is turned by the bypass lane 39 and the branching 40 and discharged to the catch tray 15.

At step S62, the sheet of page 3 of the original at the bottom of the storing part 61 is transported through the sheet-feeding lane 63. Just after the feeding operation starts at step S62, the process at step S63 starts. At step S63, the retracting roller 71 starts rotating in the reverse direction to the arrow Y, so that the sheet copied with the image of page 4 of the original and located at the retracted position is moved to the right. Further, the forwarding roller 35 starts rotating in the reverse direction to the arrow X to move the sheet to the right. Then, by the rotation of the feeding rollers 34, the sheet copied with the image of page 4 of the original is transported to the transfer station 20. Subsequently, at step S64, the sheet fed to the transfer station 20 is copied with the image of page 3 of the original and fused in the fuser assembly 26. At step S65, the sheet of page 3 of the original is discharged through the discharging lane 65 to the storing part 61. The copied sheet of the material paper is discharged to the catch tray 15, since the branching 27 is switched to the catch tray 15.

At step S66, it is judged whether the number of the sheets of the original becomes "Y". If the number does not become "Y", steps S57 to S65 are executed because all the sheets of the original have not been circulated. When all the sheets of the original have been circulated, step S67 in FIG. 9 proceeds, since the number of the fed sheets of the original becomes "Y" at step S66. This momentary condition of the original and the material paper as stored in the storing part 61, the temporary storing tray 30 and the catch tray 15, respectively, is shown in FIG. 12C. As shown in FIG. 12C, after all the sheets of the original are circulated twice, two two-sided copies corresponding to all the sheets of the original are obtained. As a result, the sheets of the original are stacked in the storing part 61 in the correct order, and pairs of two-sided copied sheets are stacked in the catch tray 15 in the correct order.

Then, 2 is added to "I" at step S67. At step S68, it is judged whether "X" is equal to "I". If these are equal, the program ends because the predetermined number of copies has been obtained. If "X" does not equal "I" at step S68, step S69 is executed. At step S69, it is judged whether "X" is equal to "I+1". If these are equal, another ordinary copying process is carried out at step S70, because one more copy is required to obtain the predetermined number of copies, and then the program ends. If "X" does not equal "I +1" at step S69, steps S51 to S66 are carried out again because more than one copy is further required to obtain the predetermined number of copies. By this sequence, two more copies can be obtained. The sequence from step S51 to S66 is carried out until "X" is equal to "I" at step S68 or "X" is equal to "I+1" at step S69. Lastly, the program ends through step S68 or step S70.

In the above explanation, four sheets of original are used for ease of understanding, although another number of sheets of the original can be used, so long as the number of sheets of the original is even.

Figure 10:
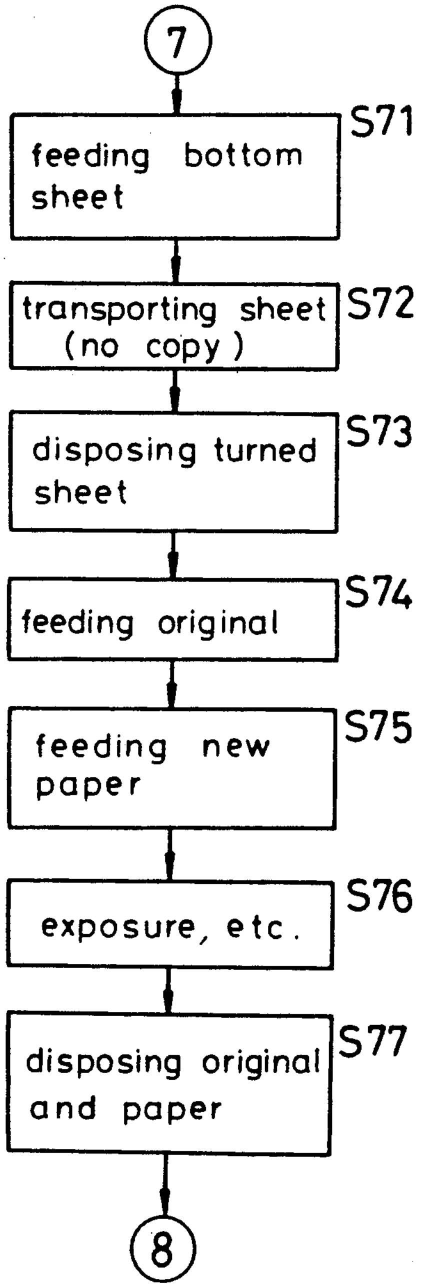

If the counted number of the original sheets is odd at step S49, the program from step S56 to step S71 in FIG. 10 is executed. At step S71, the sheet copied with the image of the odd-numbered page of the original located at the bottom of the temporary storing tray 30 is transferred by the rotation of the forwarding roller 35 and the feeding rollers 34. In this case, it is not required to copy an image to the back surface of the material paper, so that the sheet of the material paper is transported at step S72 without a copying process. At step S73, the branching 27 is switched to the turning device 28. The sheet of the material paper is turned by the bypass lane 39 and the branching 40 and discharged with the upper surface copied.

At step S74, the sheet of the odd-numbered page of the original placed at the bottom of the storing part 61 is transported through the sheet feeding lane 63. Meanwhile, at step S75, a sheet of the material paper is transported from either the bypass plate 12, or the paper cassette case 13, 14 or 70 to the transfer station 20, in synchronization with the scanning of a sheet of the original. Then, at step S76, the image corresponding to the sheet of the original is transferred to the sheet of the material paper, and the sheet of the material paper is transported to the fuser assembly 26 to be fused. At step S77, the sheet of the original is discharged through the discharging lane 65 to the storing part 61. Meanwhile, the branching 27 is switched to the catch tray 15, so that the copied sheet is discharged to the catch tray 15.

After the copy process for the sheet of the odd-numbered page of the original located at the bottom of the storing part 61, the number of the remaining sheets of the original becomes even. Therfore, by executing steps S57 to S66, the copying process on the remaining even-numbered sheets of the original is carried out and two two-sided copies are obtained. That is, after all the sheets of the original are circulated twice, two two-sided copies corresponding to all the sheets of the original are obtained. In this case, the sheets of the original are stacked in the storing part 61 in the correct order, and pairs of the two-sided copies are stacked in the catch tray 15 in the correct order.

Lastly, the processes of steps S67 and S68 are carried out, and the program ends through the processes of steps S69 and S70, if necessary.

Now the copying process for OHP sheets will be described. In the case of OHP sheets, a stack consisting of OHP sheets and their mounts stacked alternately is set on the paper storage base 33 of the temporary storing tray 30. Although, in the following description, the sheet group has a mount at its bottom, a sheet group having an OHP sheet at its bottom can be used for one of the embodiments according to the present invention.

Figure 11:
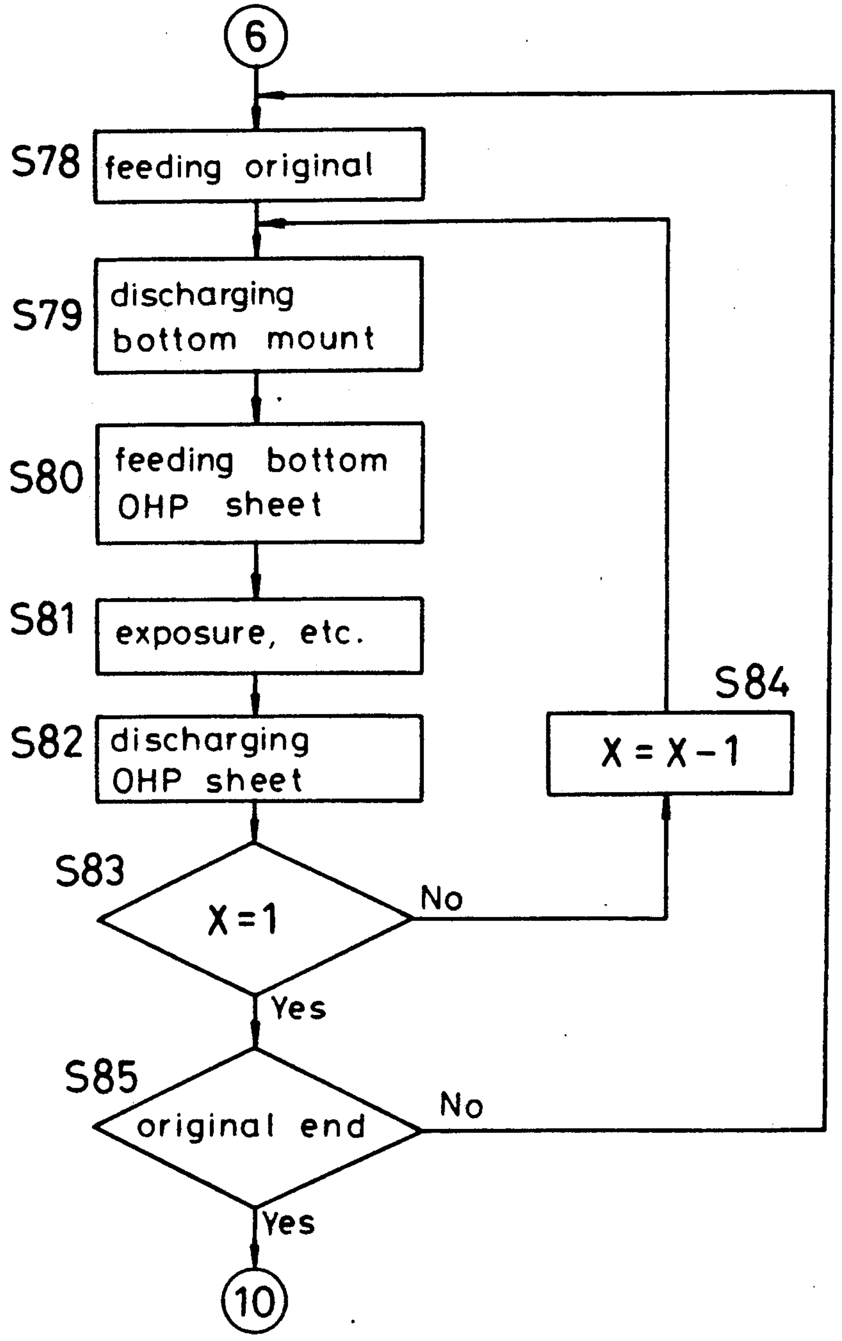
Figures 12A, 12B, 12C:
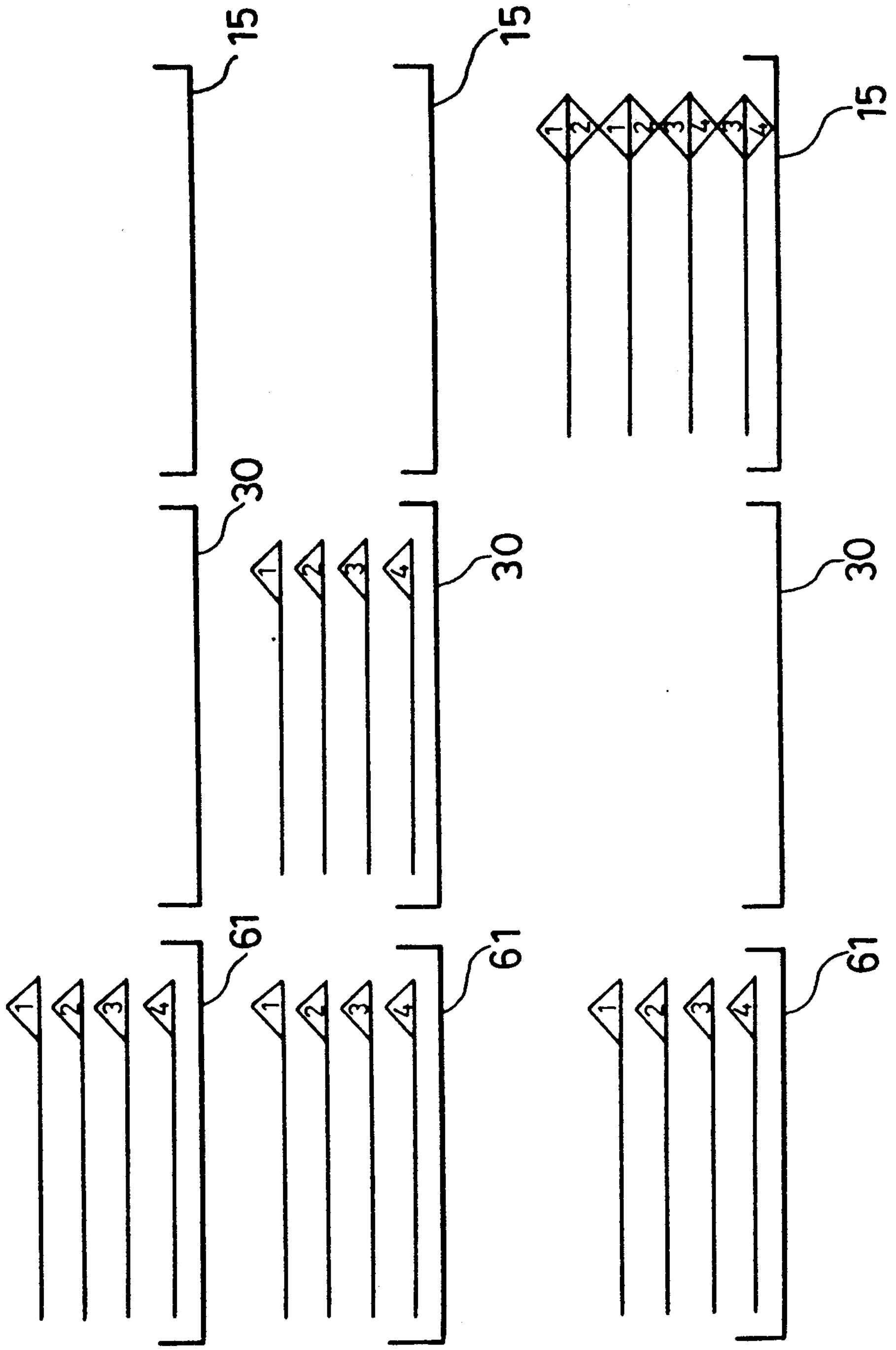
FIGS. 12A, 12B and 12C are schematic views showing a condition of original and material paper of the embodiment of FIG. 6.

In this case, depending upon the setting at step S41 in FIG. 7, the program is executed from step S44 to step S78 in FIG. 11. At step S78, a sheet of the original is transported in the same manner as the above transportation of a sheet of the original. Then, at step S79, the mount located at the bottom of the sheet group on the paper storage base 33 is discharged to the mount discharging tray 16 by the forwarding roller 35 rotating in the direction X and the retracting roller 71 rotating in the direction Y. At step S80, the OHP sheet located at the bottom of the sheet group on the paper storage base 33 is transported to the transfer station 20 by the forwarding roller 35 rotating in the reverse direction to the direction X and the feeding rollers 34 rotating subsequently. Next, at step S81, the OHP sheet fed to the transfer station 20 is copied with the image of the sheet of the original provided by the automatic original transporting apparatus 11 and is fused in the fuser assembly 26. At step S82, the branching 27 is switched to the catch tray 15 and the copied OHP sheet is discharged to the catch tray 15. At step S83, it is judged whether "X" is 1. If "X" is not 1, "X" is decreased by 1 at step S84, and then steps S79 through S82 are executed again. If "X" is 1 at step S83, the program moves to step S85 because the predetermined number of copies has been obtained. At step S85, it is judged whether all the sheets of the original have been transported. If not all the sheets of the original have been transported at step S85, steps S78 through S83 are carried out to copy the next sheet of the original. When all the sheets of the original have been copied at step S85, the program ends.

As described above, since one sheet of the material paper is transported in one direction and another sheet is transported in another direction in this embodiment, the sheets of the original can be efficiently circulated to obtain two-sided copies in reduced time. Therefore, time used for the sheets of the original to be transported only is not required, so that the processing time of the original is reduced and, as a result, the image processing time is reduced. When the stack of the OHP sheets and mounts as a sheet group is used, the OHP sheets and the mounts can be sorted. Therefore, these kinds of sheets can be easily transported.

Other Embodiments (a) When the present invention is applied to a copy machine which can make a plurality of copies by one process of exposure to the original, it is easy to obtain a large number of copies.

(b) A sorter can be provided instead of the catch tray 15. The copied sheets are discharged to the sorter. In this case, controlling the sorter for sorting the copied sheets in terms of the same page, and controlling the sorter for sorting the sheets in terms of a group corresponding to the group images of the original can be provided.

(c) The above embodiments show that the sheets of the original or material paper are alternately transported in directions reverse to each other. However, the present invention is not limited to that. For example, the sheets can be transported in one direction which is in a sideward direction to the other direction, or diagonal to the other direction.

Figure 13:
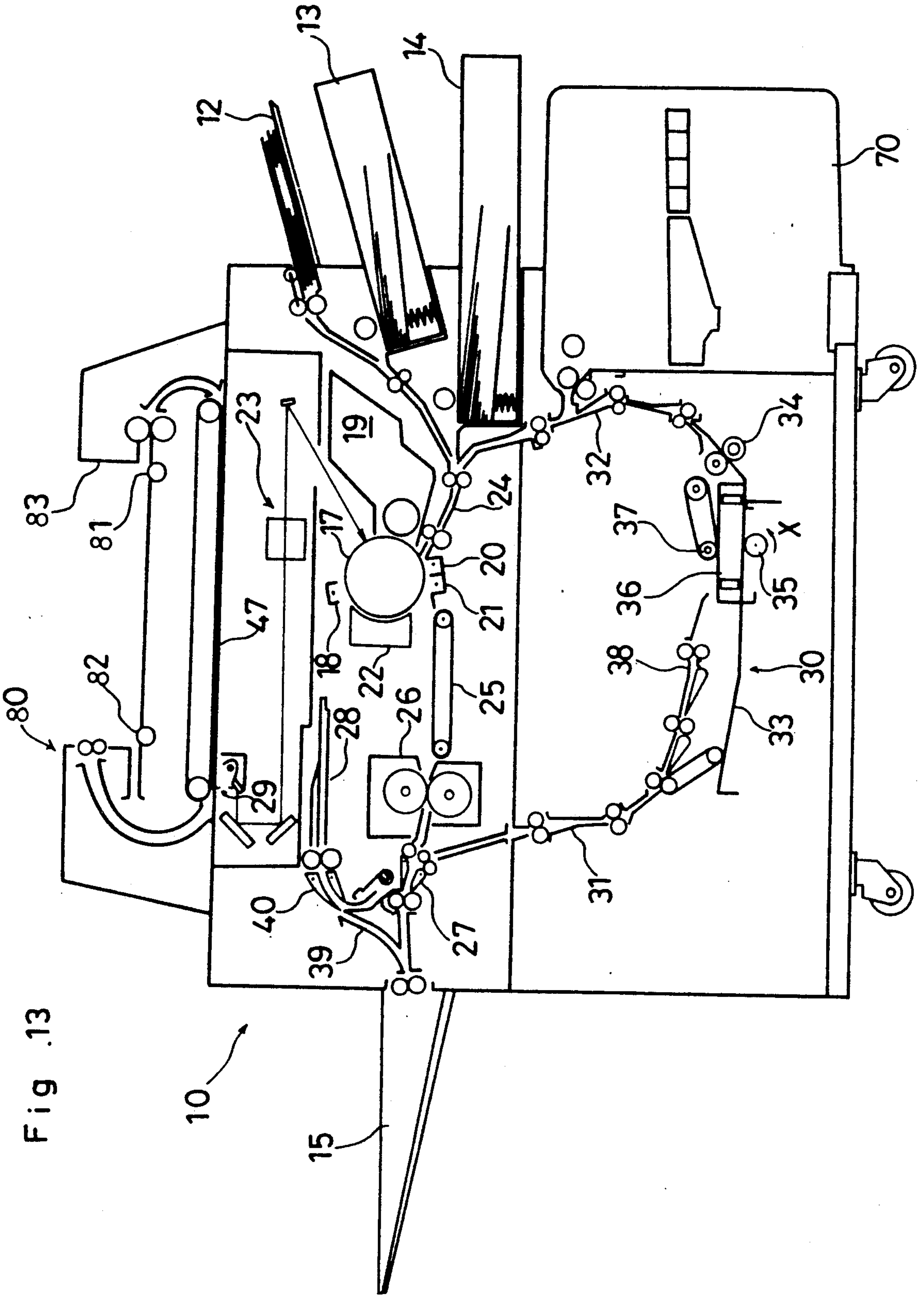
FIG. 13 is a schematic sectional view showing a copying machine of another embodiment according to the present invention.

(d) An embodiment shown in FIG. 13 can be used as an embodiment according to the present invention.

Figure 14A:
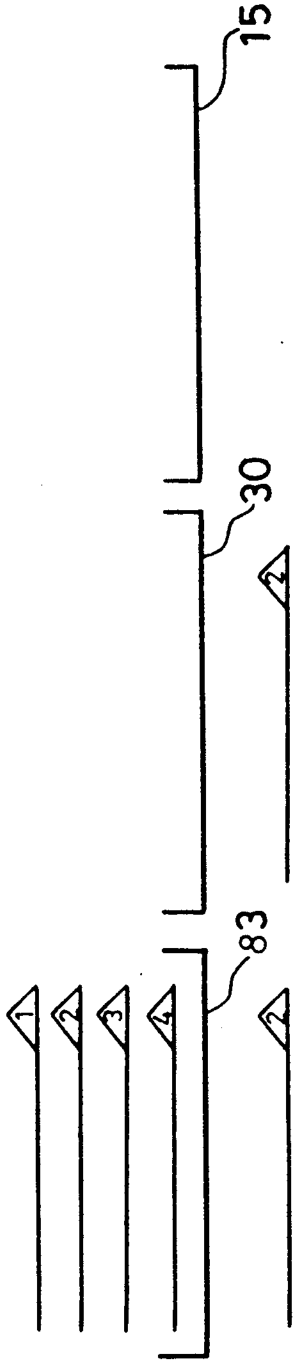
FIGS. 14A, 14B and 14C are schematic views showing a condition of original and material paper of the embodiment shown in FIG. 13.
Figure 14B:
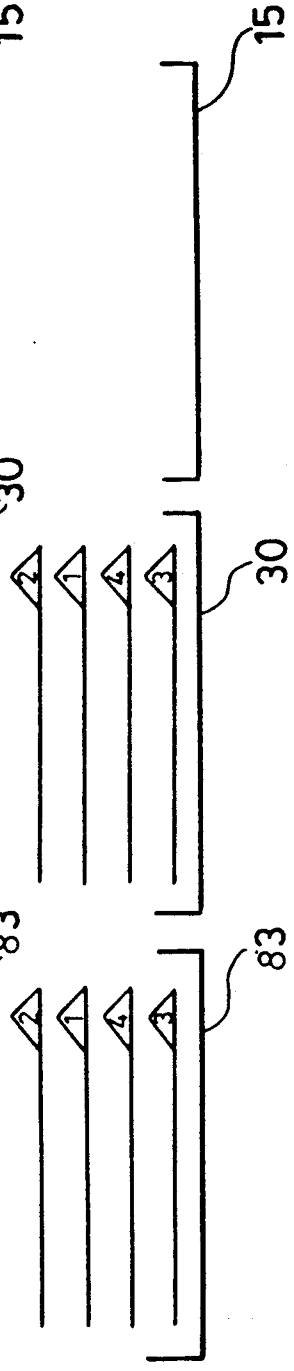
Figure 14C:
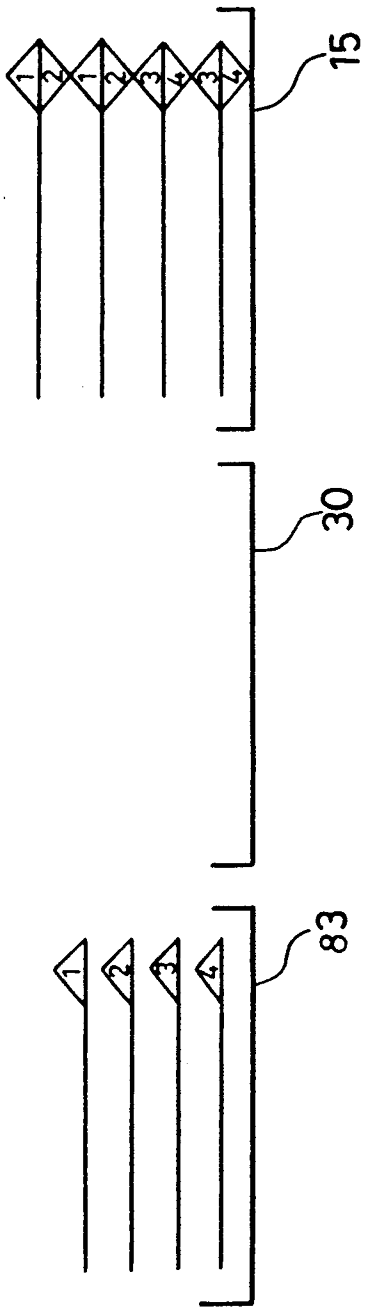

In FIG. 13, the same members as in the above embodiments have the same reference numerals. Further, in the embodiment of FIG. 13, an automatic original transporting apparatus 80 comprises a forwarding roller 81 and a retracting roller 82. Although the apparatus 80 receives a stack of the original, the rollers 81 and 82 have the same function as the rollers 35 and 81 in FIG. 6. In this embodiment, a sheet of the original located at the bottom of the stack stored in the storing part 83 is retracted first by the retracting roller 82, and then the next sheet of the original at the bottom is transferred to the exposure point 29 by the roller 81. After that, by rotating the roller 82 in reverse and then rotating the roller 81, the retracted sheet of the original is transported to the exposure point 29. Using this method, the situation of the original and material paper is changed as shown in FIGS. 14A, 14B and 14C.

According to this embodiment, the same effect as the above embodiments can be obtained.

Various details of the invention may be changed without departing from its scope. Furthermore, the foregoing description of the preferred embodiment according to the present invention is provided for the purpose of illustration only, and not for the purpose of limiting the invention being defined by the appended claims.

What is claimed is:

1. An apparatus for sorting and transferring sheets comprising:

storing means for storing a group of stacked sheets;

first transferring means for transferring one of said sheets located at an end of said group of said sheets from said storing means in a first direction;

second transferring means for transferring one of said sheets located at the end of said group of said sheets from said storing means in a second direction; and control means for controlling said first transferring means and said second transferring means, whereby said first transferring means and said second transferring means perform alternately; wherein said first direction and said second direction are different from each other.

2. An apparatus according to claim 1, further comprising returning means for returning the transferred sheet to said storing means.

3. An apparatus according to claim 2, wherein said first transferring means has a first forwarding roller provided an one end of said storing means, and said second transferring means has a second forwarding roller provided at another end of said storing means.

4. An apparatus according to claim 1, further comprising third transferring means for transferring said sheet transferred by said first transferring means in said second direction, through its original position in said storing means.

5. An apparatus according to claim 4, wherein said first transferring means and said third transferring means comprise a common roller.

6. An apparatus according to claim 5, further comprising second storing means for storing said sheet transferred in the first direction.

7. An apparatus for processing an image having an automatic original transferring apparatus comprising:

an image processing part;

storing means for storing a group of stacked original sheets;

first transferring means for discharging an original sheet located at an end of said group of original sheets from said storing means in a first direction to place an original sheet discharged by said first transferring means at said image processing part;

second transferring means for discharging an original sheet located at the end of said group of original sheets from said storing part in a second direction that is different from said first direction to place an original sheet discharged by said second transferring means at said image processing part;

return means for successively returning the pair of said original sheets placed at said image processing part to the other end of said group of original sheets; and control means for controlling said first transferring means, said second transferring means and said return means, in an order where said first transferring means performs its discharging first, said second transferring means performs its discharging second and said return means performs its returning third.

8. An apparatus according to claim 7, wherein said first transferring means has a first transferring belt having a transfer surface, said second transferring means has a second transferring belt having a transfer surface on the same level as that of the first transferring belt, and said image processing part has an exposure point opposed to said first and second transferring belts.

9. An apparatus according to claim 8, wherein said first transferring means has a first forwarding roller located at an end of said storing means, and said second transferring means has a second forwarding roller located at another end of said storing means.

10. An apparatus according to claim 9, wherein said control means controls said first transferring means to discharge an original sheet in said first direction, and said second transferring means to discharge the next original sheet in said second direction just after said sheet transferred by said first transferring means leaves said second forwarding roller.

11. An apparatus according to claim 10, further comprising:

detecting means for detecting whether the number of original sheets in said storing means is even or odd; and second control means for controlling said first transferring means to transfer one original sheet when the number of original sheets is odd.

12. An apparatus for processing an image having an automatic paper feeding apparatus comprising:

an image processing part having a position for processing an image;

storing means for storing a group of stacked sheets;

transferring means for transferring a first sheet located at an end of said group of sheets from said storing means in a first direction away from an initial position of said sheet, and for transferring said first sheet through its original position in a second direction different from said first direction to place said first sheet at said image processing position;

feeding means for transferring a next sheet located at the end of said group of sheets from said storing means in said second direction to place said next sheet at said image processing position;

and control means for controlling said transferring means to transfer said first sheet in said first direction, controlling said feeding means to transfer said next sheet in said second direction, and thereafter controlling said transferring means to transfer said first sheet in said second direction. transfers said sheet.

13. An apparatus according to claim 12, wherein said transferring means and said second feeding means comprises a common roller.

14. An apparatus according to claim 13, further comprising a storing path through which sheets from said image processing part are stored in said storing part; wherein said storing path has a turning means to turn said sheets.

15. An apparatus according to claim 14, further comprising second storing means for storing said sheet transferred in said first direction.

16. An apparatus according to claim 15, further comprising second control means for controlling said first feeding means to store said sheet in said second storing means by transferring the sheet in said first direction, and to transfer the next sheet in said second direction.

17. An apparatus for processing an image having an automatic original transporting apparatus comprising:

an image processing part;

storing means for storing a group of originals as a stack of sheets;

transferring means for transferring a sheet located at an end of the said group of original sheets from said storing means in a first direction away from said sheet's initial position and for transferring said sheet through its original position in a second direction different from said first direction to place said sheet at said image processing part;

feeding means for transferring a next sheet located at the end of said group from said storing means in said second direction to place said next sheet at said image processing part; and control means for controlling said transferring means to transfer said sheet in said first direction, controlling said feeding means to transfer said next sheet in said second direction, and thereafter controlling said transferring means to transfer said sheet first transferred in said first direction in said second direction.

18. An apparatus according to claim 17, wherein said transferring means and said second feeding means comprise a common roller.

* * * * *